US006990457B1

(12) United States Patent
Litman et al.

(10) Patent No.: US 6,990,457 B1
(45) Date of Patent: Jan. 24, 2006

(54) SYSTEM AND METHOD FOR CONDUCTING TRANSACTIONS INVOLVING GENERICALLY IDENTIFIED ITEMS

(75) Inventors: David S. Litman, Dallas, TX (US); Robert B. Diener, Surfside, FL (US); Anthony J. Fiacable, Dallas, TX (US)

(73) Assignee: Hotels.com, Dallas, TX (US)

( * ) Notice: Subject to any disclaimer, the term of this patent is extended or adjusted under 35 U.S.C. 154(b) by 898 days.

(21) Appl. No.: 09/589,037

(22) Filed: Jun. 6, 2000

(51) Int. Cl.
*G06F 17/00* (2006.01)
(52) U.S. Cl. ............................................ 705/5; 705/27
(58) Field of Classification Search .................... 705/5, 705/6, 26, 37, 28, 100, 101, 104
See application file for complete search history.

(56) References Cited

U.S. PATENT DOCUMENTS

| 5,047,614 | A | * | 9/1991 | Bianco |
| 5,732,398 | A | * | 3/1998 | Tagawa et al. |
| 5,832,452 | A | * | 11/1998 | Schneider et al. |
| 6,249,773 | B1 | * | 6/2001 | Allard et al. |
| 6,404,877 | B1 | * | 6/2002 | Bolduc et al. |
| 6,550,672 | B1 | * | 4/2003 | Tracy et al. |

FOREIGN PATENT DOCUMENTS

WO          WO 00/19351     *  4/2000

OTHER PUBLICATIONS

Franz, Julie; Ten Years May Be Generic Lifetime; 1989; Advertising Age; web copy 4 oages.*
Stambaugh, Sandie; To store brand or not to store brand?; Jun. 1993; Aftermarket Business v103, n6, p. 16(6); dialog copy 10 pages.*
priceline.com; "Name Your Price for Hotel Rooms and get an answer in one hour or less;" Internet; http://www.priceline.com; downloaded May 26, 2000; all.

* cited by examiner

*Primary Examiner*—Thomas A Dixon
(74) *Attorney, Agent, or Firm*—Sughrue Mion, PLLC

(57) ABSTRACT

A transaction system includes an item master database that stores generic information and specific information associated with one or more items and an inventory database that stores availability and price data associated with the items. The transaction system also includes a transaction engine that receives an item availability request including one or more parameters. The transaction engine accesses the item master database and the inventory database to obtain information associated with the request and determines one or more items that meet the parameters of the request. The transaction system also communicates a list of the items meeting the parameters. The list includes at least one generic item listing. Furthermore, the transaction system receives a request for an item associated with a generic item listing and completes a transaction associated with the item.

40 Claims, 9 Drawing Sheets

FIG. 2 hoteldiscount!com

RATES UP TO 70% OFF - ROOMS FOR SOLD-OUT DATES book online or call
800-715-7666
int'l 214-369-1264
fax 214-363-3978

NASDAQ:ROOM    A SERVICE OF HRN SINCE 1995

Home|Customer Service|Affiliate With Us|Add your Hotel|About    HOTEL SEARCH

New York, New York
Search for Available Hotels

Check In Date: [May ▼] [29 ▼], [2000 ▼]
# of Nights: [2 ▼]    # of Adults: [2 ▼]
# of Children: [0 ▼]    # of Beds: [1 ▼]
Smoking: [No ▼]

( Display ONLY Available Hotels )
(please book one room at a time)

Other Searches

View ALL Hotels in
New York
- by Name
- by Quality (Star Rating)
  High to Low
  Low to High
- by Location
- by Price View City Map Search for Hotels in
New York
[_____] [Go]

FIG. 3 hoteldiscount!com
RATES UP TO 70% OFF - ROOMS FOR SOLD-OUT DATES
NASDAQ:ROOM    A SERVICE OF HRN SINCE 1995 book online or call
800-715-7666
int'l 214-369-1264
fax 214-363-3978

Home | Customer Service | Affiliate With Us | Add your Hotel | About    AVAILABLE HOTELS New York, New York
Arriving: Monday, May 29, 2000 for 2 Nights
(Rates listed are for Double Occupancy in US Dollars, not including taxes)

| Hotel Name | Location | Click Below | | | 5/29/00 | 5/30/00 |
|---|---|---|---|---|---|---|
| ★★★  *SPECIAL VALUE* MAJOR BRAND HOTEL | MIDTOWN | BOOK IT | HOTEL INFO | MAP | 179.95 | 179.95 |
| ★★  *SPECIAL VALUE* THE BELLECLAIRE | 77TH/BWY | BOOK IT | HOTEL INFO | MAP | 169.95 | 154.95 |
| ★★★♪  *SPECIAL VALUE* BROADWAY PLAZA | 27TH AND BROADWAY | BOOK IT | HOTEL INFO | MAP | 185.95 | 185.95 |
| ★★★♪  *SPECIAL VALUE* CARNEGIE SUITES | 58TH/BWY | BOOK IT | HOTEL INFO | MAP | 169.95 | 169.95 |
| ★★♪ CLARION FIFTH AVENUE | MIDTOWN/FIFTH AVENUE | BOOK IT | HOTEL INFO | MAP | 232.04 | 249.95 |
| ★♪  *SPECIAL VALUE* HOWARD JOHNSON 34TH | 34TH/8TH | BOOK IT | HOTEL INFO | MAP | 129.95 | 129.95 |
| ★★★  *SPECIAL VALUE* MILFORD PLAZA | 45TH/8TH | BOOK IT | HOTEL INFO | MAP | 129.95 | 129.95 |
| ★★★★♪  *PRESIDENT'S CHOICE* MAJOR BRAND HOTEL | CENTRAL PARK | BOOK IT | HOTEL INFO | MAP | 199.95 | 199.95 |
| ★★★★ SHERATON NY | 52ND/7TH | BOOK IT | HOTEL INFO | MAP | 198.95 | 198.95 |
| ★★★♪ EMPIRE - STANDARD | 63RD/BWY | BOOK IT | HOTEL INFO | MAP | 129.95 | 179.95 |
| ★★★  *PRESIDENT'S CHOICE* WALDORF-STAFF ROOM | PARK/50TH | BOOK IT | HOTEL INFO | MAP | 199.95 | 199.95 |

Guide to Star Ratings

More Choices ->   120  122   Pricing Guarantee

INFO ON THE "MAJOR BRAND PROGRAM"    1-800-715-7666

130 hoteldiscount!com
RATES UP TO 70% OFF – ROOMS FOR SOLD-OUT DATES
NASDAQ:ROOM    A SERVICE OF HRN SINCE 1995 book online or call
800-715-7666
int'l 214-369-1264
fax 214-363-3978

Home | Customer Service | Affiliate With Us | Add your Hotel | About          HOTEL INFO

MAJOR BRAND HOTEL
★★★★

| INFO ON THE "MAJOR BRAND PROGRAM" |                                  | CHECK RATES |

MAJOR BRAND HOTEL
NEW YORK, NY

MIDTOWN

Hotel Description

Charming, superior first class landmark hotel near the Theatre District and a short walk from Times Square. Rooms featuring: Individual climate control, cable TV, hairdryer, robe, computer-compatible, phone and safe. Recent additions include state-of-the-art fitness center and full-service business center. Garage parking across the street is available for guests at $25. Maximum number of person is two per room.

Stay Information:

- Check in time: 3:00 PM
- Check out time: 12:00 PM
- Saturday Arrival: Yes

Property Amenities:

- Hotel Parking
- Restaurant
- Lounge
- Gym
- Air Conditioning

132

Click Here to Return to Previous Page 1-800-715-7666

*FIG. 4*

FIG. 5 hoteldiscount!com
RATES UP TO 70% OFF – ROOMS FOR SOLD-OUT DATES
NASDAQ:ROOM    A SERVICE OF HRN SINCE 1995 book online or call
800-715-7666
int'l 214-369-1264
fax 214-363-3978

Home | Customer Service | Affiliate With Us | Add your Hotel | About    RESERVATIONS FORM New York, New York travel agents click here Make Reservation for : MAJOR BRAND HOTEL
Arriving: Monday, May 29, 2000
*=required fields 1. Select Room Type
   ⊙ STANDARD /1-2 PERSON

5/29/2000    5/30/2000
   USD $279.95    $279.95

2. Enter Guest Name & Email
   *First/Last: [ ] [ ]
   *E-Mail Address: [ ]    Business Name: [ ]

3. Enter your Address as it appears on your Credit Card Statement
   *Address: [ ] [ ]    *City: [ ]
   State/Province *US & Canada only: [ ]    *Country: [UNITED STATES ▾]    Zip/Postal Code *US & Canada only: [ ]

4. Enter Contact Info (a work or home phone number is required)
   Work Phone: [ ] extension [ ]    Home Phone: [ ]    Fax: [ ]

5. Select Payment Option (reservations prepaid on Credit Card)
   All Credit Card Information is Encrypted for Privacy over the Internet Credit Card Encrypted for Security:
   ○ VISA  ○ American Express  ○ MasterCard
   ○ Discover  ○ Diner's Club Card Number [ ]    Expiration Month [ ]    Year [ ]

– OR –:  ○ Fax Credit Card Number and Expiration Date
             to Hotel Reservations Network at 214-363-3978
             Refer to CODE HRN – OR –:  ○ I will call 1-800-715-7666 ext. 1379 with my credit
             card information ( Click to CONTINUE Reservation )
   * = required fields

150 hoteldiscount!com
RATES UP TO 70% OFF – ROOMS FOR SOLD-OUT DATES
NASDAQ:ROOM     A SERVICE OF HRN SINCE 1995 book online or call
800-715-7666
int'l 214-369-1264
fax 214-363-3978

Home | Customer Service | Affiliate With Us | Add your Hotel | About     VERIFY RESERVATION Please REVIEW your information, then CLICK below to submit reservation.

Reservation in New York at MAJOR BRAND HOTEL for:
1 Non-Smoking Room with 1 Bed for 2 Adults

| Room Type/Rate: | 5/29/2000 | 5/30/2000 |
| --- | --- | --- |
| STANDARD /1-2 PERSON (USD excluding local tax) | 279.95 | 279.95 |

Total Price for 2 nights:
(USD including local tax and fees)                 640.00

Your Name and Credit Card Billing Address:
JOHN M. PRICE
200 MAIN ST.
DALLAS, TX 75201

152

Phone Numbers:
Work: 214-543-5432     Email: jprice@aol.com

Payment Option:
MasterCard # 5401999999999999     Exp Date: 09/02

( Click to BOOK Reservation )—154
– OR –
Click to Go Back and Change Your Information POWERED BY
hotel ⑦ discounts          1-800-715-7666

*FIG. 6*

FIG. 7 hoteldiscount!com
RATES UP TO 70% OFF — ROOMS FOR SOLD-OUT DATES
NASDAQ:ROOM    A SERVICE OF HRN SINCE 1995 book online or call
800-715-7666
int'l 214-369-1264
fax 214-363-3978

Home | Customer Service | Affiliate With Us | Add your Hotel | About    RESERVATION CONFIRMATION Congratulations! Your reservation has been succesfully booked.

Your HRN Booking/Confirmation Number is: 123434567

Your reservation is part of the Hotel Reservations Network block of rooms at the Hotel. Information on individual reservations is not available at the Hotel. Please refer to the Hotel Reservations Booking/Confirmation Number above if you contact HRN for any reason.
===Contact Information and Quick Links===

Customer Service
Home Page
Hotel Info
Map to the Hotel
Hot Deals
Free Newsletter
Discount Car Rental Want information on New York?
The CitySearch city guides provide the best information for visitors to the city. Our up-to-date information includes arts and entertainment events, restaurants, business services and more. All you need to plan your business or leisure trip. newyork.citysearch.com Want to buy tickets for arts & entertainment events while visiting the city? Find out what's playing and purchase online at Ticketmaster.com ===Reservation Details===

Guest:
  JOHN M. PRICE
  200 MAIN ST.
  DALLAS, TX 75201

Hotel:
  GARDEN PLACE SUITES

Stay Information:
  Check In: 05/29/2000
  Number of Nights: 2
  Number of Adults: 2
  Number of Children: 0
  Room Type: STANDARD /1-2 PERSON
  Smoking: N
  Refund Policy: NON-REFUNDABLE Total Price including Tax and Fees: $640.00

FIG. 8 hoteldiscount!com
RATES UP TO 70% OFF - ROOMS FOR SOLD-OUT DATES
NASDAQ:ROOM    A SERVICE OF HRN SINCE 1995 book online or call
800-715-7666
int'l 214-369-1264
fax 214-363-3978

Home|Customer Service|Affiliate With Us|Add your Hotel|About     HOTEL INFO

GARDEN PLACE SUITES
★★★★

GARDEN PLACE SUITES
64 W 44TH ST
NEW YORK, NY 10036
44TH/6TH

MAP    EXTERIOR

Hotel Description

Charming, superior first class landmark hotel adjacent to the Theatre District and a three-minute walk from Times Square. English country manor ambiance with rooms featuring: Individual climate control, cable TV, hairdryer, robe, computer-compatible, phone and safe. Recent additions include state-of-the-art fitness center and a full-service business center. Garage parking across the street is available for guests at $25. The hotel's Lobby cafe is open daily from 7:00 a.m. to 11:30 p.m. Sunday-Thursday, and 7:00 a.m. to 12:30 for Friday and Saturday. Maximum number of persons is two per room.

Hotel Information:

- Rating: 4.0 Stars
- Floors: 12
- Rooms: 142
- Handicap Access: Yes

Stay Information:

- Check in time: 3:00 PM
- Check out time: 12:00 PM
- Saturday Arrival: Yes

Property Amenities:

- Hotel Parking
- Restaurant
- Lounge
- Gym
- Air Conditioning

Click Here to Return to Previous Page

SYSTEM AND METHOD FOR CONDUCTING TRANSACTIONS INVOLVING GENERICALLY IDENTIFIED ITEMS

TECHNICAL FIELD OF THE INVENTION

This invention relates generally to the field of product and service transactions, and more particularly to a system and method for conducting transactions involving generically identified items.

BACKGROUND OF THE INVENTION

When planning a vacation or business trip, travelers have a wide array of sources through which they can make lodging arrangements. These sources include the actual lodging establishments themselves as well as a number of third parties through which reservations may be made. These third parties include travel reservation companies that provide World Wide Web ("Web") sites or telephone call centers through which customers can reserve hotel rooms. These Web sites and call centers are abundant and competition to attract customers pressures these third parties to provide low lodging prices. This competition is heightened by the ease of comparison shopping between travel reservation companies on the Web. However, although lodging establishments may wish to provide their rooms for resale by these third parties at discount prices (to ensure that the maximum number of rooms are occupied at any given time), the lodging establishments do not want to undercut their regular room prices by flooding the market with discounted prices. For example, many customers may be willing to pay the regular price for a hotel room, but instead may find and make a reservation at a discounted price offered by a reservation company. Therefore, many hotels and other lodging establishments do not sell their rooms or sell a limited number of rooms through these third parties at discounted prices.

One company that has attempted to address this problem is Priceline.com. Priceline.com uses a "reverse auction" technique where customers select a location, date and price for which they would like a hotel room, and Priceline.com then provides this bid to hotels. If a hotel accepts the bid, the customer is typically required to stay at the accepting hotel. However, a customer knows very little about the hotel before being bound by a bid that the customer has made. For example, the customer may only be able to specify a minimum rating on a rating scale that the accepting hotel must have and a general location at which the hotel is located, such as in a downtown area. Therefore, many customers are reluctant to use this service and hotels are restricted in their ability to sell their excess rooms at a discounted price.

SUMMARY OF THE INVENTION

According to the present invention, disadvantages and problems associated with previous systems and methods have been substantially reduced or eliminated.

According to one embodiment of the present invention, a transaction system includes an item master database that stores generic information and specific information associated with one or more items and an inventory database that stores availability and price data associated with the items. The transaction system also includes a transaction engine that receives an item availability request including one or more parameters. The transaction engine accesses the item master database and the inventory database to obtain information associated with the request and determines one or more items that meet the parameters of the request. The transaction system also communicates a list of the items meeting the parameters. The list includes at least one generic item listing. Furthermore, the transaction system receives a request for an item associated with a generic item listing and completes a transaction associated with the item.

According to another embodiment of the present invention, a hotel reservation system includes a hotel master database that stores generic information and specific information associated with one or more hotels and an inventory database that stores a number of rooms available at the hotels on one or more dates and a price of each room. The hotel reservation system also includes a reservation engine that receives a hotel availability request that includes one or more parameters. The reservation engine accesses the hotel master database and the inventory database to obtain information associated with the request and determines one or more hotels that meet the parameters of the request. The reservation engine communicates a list of the hotels meeting the parameters. The list of hotels includes at least one generic hotel listing. Furthermore, the reservation engine receives a reservation request for a hotel associated with a generic hotel listing and creates a reservation according to the reservation request.

The systems and methods of the present invention provide a number of important technical advantages. The present invention overcomes the problem of undercutting non-discounted hotel room prices associated with prior reservation systems by providing generic listings of hotels having discounted room prices that do not disclose the identity of the hotel, but which provide sufficient information to allow a user to select an appropriate hotel. Since the hotel's real name is not identified until after the user has made a reservation, users are prevented from comparing the discounted price of a particular hotel listed by the present invention and a higher non-discounted price listed by the hotel, third-party reservation systems, or any other source. For example, if a user were to perform a search on the Web for a specific hotel name and associated prices, Web pages associated with the present invention would typically not be found since only a generic name is associated with the hotel (at least initially).

Furthermore, unlike previous systems and methods, such as Priceline.com's reverse auction, the present invention provides a user with both a price of a hotel room and an adequate description of the hotel before the user must commit to making a reservation. Therefore, hotels are allowed to sell rooms at discounted prices without initially revealing their identity and users are given sufficient information about the hotel to make an informed reservation decision. In addition, the system and method of the present invention may be used for transactions associated with other items besides hotel rooms. Therefore, the advantages described above apply equally to transactions involving other products and services besides hotel rooms.

Other important technical advantages are readily apparent to those skilled in the art.

BRIEF DESCRIPTION OF THE DRAWINGS

To provide a more complete understanding of the present invention and further features and advantages thereof, reference is now made to the following description taken in conjunction with the accompanying drawings, in which:

FIG. 2 illustrates an exemplary hotel search page that may be communicated by the hotel reservation system;

FIG. 3 illustrates an exemplary hotel listing page that may be communicated by the hotel reservation system;

FIG. 4 illustrates an exemplary generic hotel description page that may be communicated by the hotel reservation system;

FIG. 5 illustrates an exemplary reservation inquiry page that may be communicated by the hotel reservation system;

FIG. 6 illustrates an exemplary reservation verification page that may be communicated by the hotel reservation system;

FIG. 7 illustrates an exemplary reservation confirmation page that may be communicated by the hotel reservation system;

FIG. 8 illustrates an exemplary specific hotel description page that may be communicated by the hotel reservation system.

DETAILED DESCRIPTION OF THE INVENTION

Figure 1:
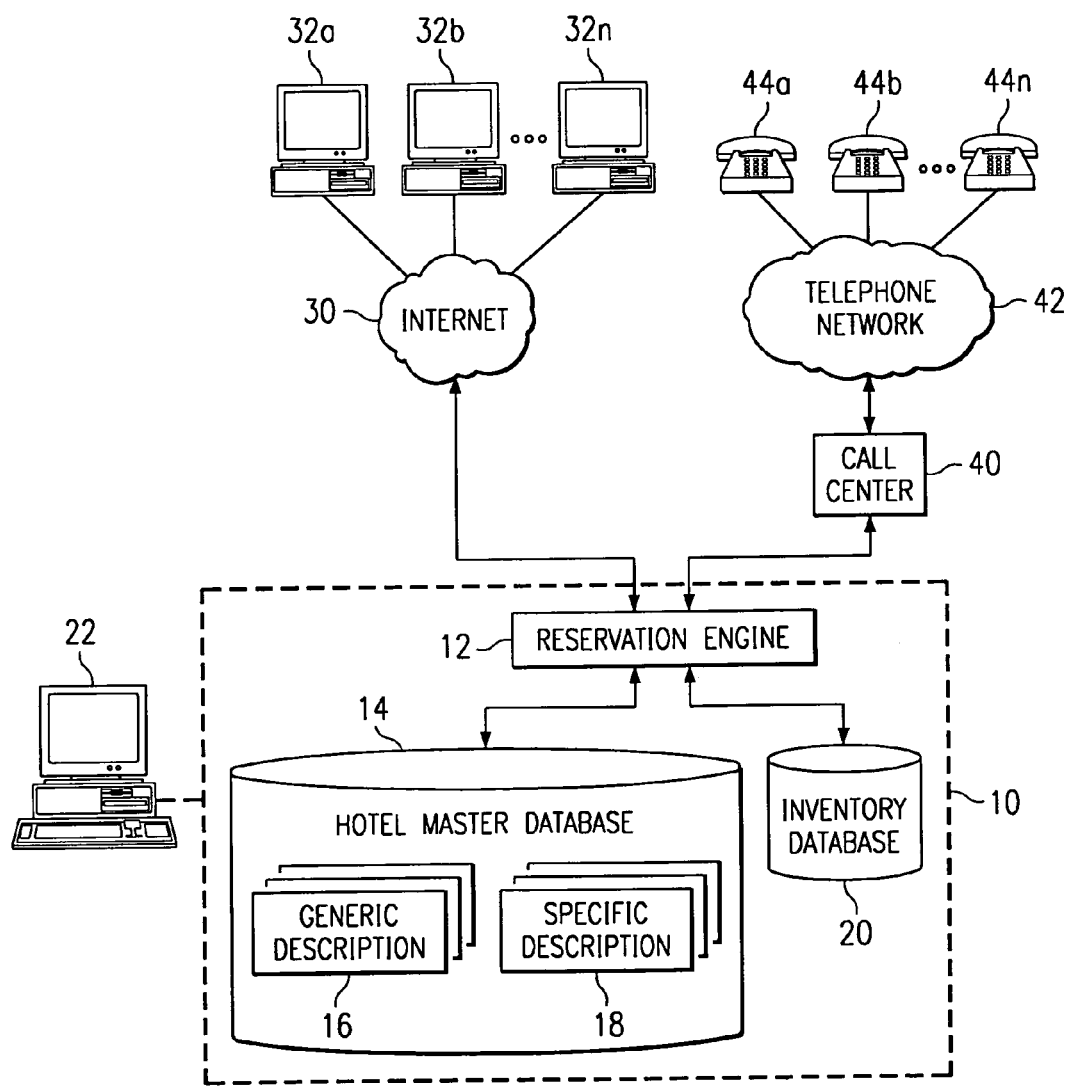
FIG. 1 illustrates an exemplary hotel reservation system incorporating teachings of the present invention.

FIG. 1 illustrates an exemplary hotel reservation system 10 incorporating teachings of the present invention. The term "hotel" should be understood to include any appropriate type of lodging including, but not limited to, hotels, motels, lodges, inns, condominiums, hotels, and cottages. Likewise, the terms "hotel room" or "room" includes any appropriate unit of a "hotel" that may be reserved using reservation system 10. Reservation system 10 includes a reservation engine 12 that may receive inquiries regarding hotel availability, communicate selected hotel options and information to the requester, receive and process hotel reservation requests, and perform any other appropriate functions related to the booking of hotel reservations. Reservation engine 12 is coupled to a hotel master database 14 that includes information relating to hotels at which reservations may be made through reservation system 10. As described below, hotel master database 14 may include both generic descriptions 16 of hotels and specific descriptions 18 of hotels. Reservation engine 12 is also coupled to an inventory database 20, which may be integral to or separate from hotel master database 14. Inventory database 20 may include data indicating the number of rooms available for a certain date or dates at the hotels in hotel master database 14. Inventory database 20 may also include data indicating the price of the rooms on the available dates. Reservation engine 12, hotel master database 14, and inventory database 20 may be implemented together or separately as software and/or hardware that operates on one or more computers 22 at one or more locations.

Reservation system 10 may be coupled to the Internet 30 or any other suitable wireline or wireless network that supports communications between one or more computers 32a–32n and reservation system 10. In a particular embodiment, reservation system 10 includes Hypertext Markup Language (HTML) documents or other suitable documents that may be communicated over Internet 30 for display on computers 32. The term "Web pages" will be used to encompass HTML documents and any other appropriate techniques of displaying content using Internet 30, such as Extensible Markup Language (XML) documents. Computers 32 may include interfaces, Web browsers, or any other hardware, software or other components to facilitate connection to Internet 30 and display of Web pages. For example, generic descriptions 16 and specific descriptions 18 of hotels in hotel master database 14 may be included in Web pages that reservation engine 12 communicates over Internet 30 and that are displayed at computers 32. Other appropriate Web pages that are used in the operation of reservation system 10 and which are described below may be stored in hotel master database 14 or any other appropriate storage medium associated with reservation system 10.

Reservation system 10 may also be coupled to a call center 40. Call center 40 may be coupled to any appropriate telephone network 42, such as the Public Switched Telephone Network (PSTN), and includes one or more operators that receive calls from users of telephones 44a–44n coupled to telephone network 42. Instead of or in addition to communicating Web pages to computers 32, reservation engine 12 may also communicate call scripts to operators located at call center 40. These call scripts may be displayed on a computer so that the operator can read the script to a user that has called call center 40 using a telephone 44. For example, generic descriptions 16 and specific descriptions 18 of hotels in hotel master database 14 may be included in scripts that reservation engine 12 communicates to call center 40. Alternatively, reservation engine 12 may communicate Web pages to operators at call center 40 so that the operators may read the contents of the Web pages to users of telephones 44.

In an exemplary embodiment, reservation system 10 is maintained and run by a third party, such as a travel reservation company or a travel agent, that reserves hotel rooms from numerous hotels and offers the rooms to the general public. Reservation system 10 may also be maintained and run by one or more hotels. In an exemplary transaction using Internet 30, a user using a computer 32 requests a Web site associated with the travel reservation company or other appropriate entity. The Web site provides the user with a selection of different cities in which hotels are available. The user then selects a city and other appropriate criteria, such as the date on which a hotel room is desired. In response to the user's selection, reservation system 10 provides the user with a list of available hotels. A similar list may be provided over the phone by a user that has called in to call center 40 using telephone network 42.

Reservation system 10 and previous reservation systems may be used to provide discount hotel prices based on volume discounts or other special pricing arrangements made with hotels. In response to reservation inquiries by users, prior reservation systems have typically provided the user with a list of specific hotel names that meet the user's criteria. However, due to the discount prices offered through the reservation system, many hotels choose not to be included in these lists to prevent their regular, non-discounted prices from being undercut. For this reason, the number of hotels at which reservations may be made using prior reservation systems has been limited. Reservation system 10 of the present invention overcomes this disadvantage associated with prior reservation systems by providing generic listings of hotels that do not disclose the identity of the hotel, but which provide sufficient information to allow a user to select an appropriate hotel. Since the hotel's real name is not identified until after the user has made a reservation, users are prevented from comparing the discounted price of a specific hotel listed by reservation system 10 and a higher non-discounted price listed by the hotel, other reservation systems, or any other source.

In addition, although hotel reservation system 10 is described, the present invention also encompasses the generic identification or description of any product or service in the initial stages of a sale, promotion, auction, or trading of the product or service or any other appropriate transaction associated with the product or service. The term "item" will be used to encompass any such products or services. For example, instead of a hotel room, generically identified airline tickets or complete vacation packages could also marketed and sold. Furthermore, non-travel related items, such as electronics, food products, automobiles, repair services or any other items can be sold or otherwise distributed using generic identifications and descriptions. The generic hotel transaction process described below has many other applications that are included within the scope of the present invention and will be recognized by one of skill in the art. For those transactions that do not involve hotel rooms or other items that may be reserved, reservation engine 12 may be replaced by a transaction engine that is operable to perform any transaction associated with generically identified items (not just making reservations). Furthermore, hotel master database 14 may be replaced by an item master database that includes information associated with any type of item, and inventory database 20 may include availability and price data associated with these items.

FIGS. 2 through 8 illustrate exemplary Web pages that may be provided or "served" by reservation engine 12 to one or more computers 32 to facilitate the hotel reservation process. It should be understood that many other appropriate Web pages may be provided in addition to or instead of the illustrated Web pages, which are provided only as examples. Appropriate modifications may be made to the content of the Web pages for transactions involving items other than hotel rooms. In addition, although Web pages are illustrated, similar scripts may be provided to an operator at call center 40 to facilitate the telephone reservation process. References below to a user selecting an option on a Web page may alternatively be performed in a telephone reservation situation by the user verbally selecting an option or using any other appropriate method, such as entering a touch tone digit using telephone 44.

FIG. 2 illustrates an exemplary hotel search page 100. Search page 100 includes one or more availability search fields 102 that allow a user at a computer 32 to search for available hotels meeting certain parameters entered by the user in search fields 102. Although exemplary search page 100 is specifically a Web page for hotels in New York (which may be provided based on the user's selection of New York on a previous Web page), search page 100 may allow a search of hotels in numerous cities and include a search field for the city in which the hotel stay is desired. Furthermore, any other appropriate search fields 102 may also be included. Using information selected or input by the user in search fields 102 and communicated to reservation engine 12, reservation engine 12 may generate a listing of hotels that meet the search requirements.

In addition to providing a search mechanism, search page 100 also provides the user with display options 104 that allow all available hotels (in New York, for example) to be displayed in order according to a certain parameter. For example, the hotels available in New York may be displayed in order according to their name (alphabetical order), quality (for example, based on a star rating scale), price, or location. The hotels may also be ordered in any other appropriate manner. Search page 100 may also include a name search field 106 that allows users to enter the name of a hotel or a portion of the name of a hotel for which the user would like reservation information.

FIG. 3 illustrates an exemplary hotel listing page 110. Listing page 110 includes a list 112 of hotels generated by reservation engine 12 in response to a search or other request by a user. For example, listing page 110 may be communicated from reservation engine 12 to a computer 32 in response to a user's search for hotels in New York having rooms available on May 29–30, 2000. Reservation engine may access hotel master database 14 to determine hotels that meet the user's search criteria and may access inventory database 20 to determine which of these hotels have rooms available for the dates selected by the user. Reservation engine may then generate an appropriate list 112 in response to the information obtained from hotel master database 14 and inventory database 20.

List 112 may include a hotel name, a location, and a room price for each date requested. As described above, unlike previous reservations systems, reservation engine 12 may include one more generic hotel listings 114. Although each generic hotel listing 114 is associated with a specific hotel, listing 114 identifies the hotel using a generic name and an approximate location. For example, generic hotel listings 114 may use the generic name "Major Brand Hotel" and may identify a general location of the hotel (for example, "Downtown"). Generic hotel listings 114 include the actual price of the room at the associated hotel, which is typically discounted from the price that is advertised by the hotel or that is listed with travel agents. As described above, this allows a hotel to sell rooms at a discounted price without undercutting the hotel's regular room prices (or less discounted room prices) listed at other web sites, in brochures, at travel agencies, or any other appropriate location. Reservation engine 12 may determine that a generic hotel listing 114 should be displayed for a hotel based on a flag or other indicator associated with the hotel's information in either database 14 or 20. Reservation engine may alternatively make this determination in any other appropriate manner.

List 112 also may include one or more specific hotel listings 116 that include specific hotel names and locations. In some cases, specific hotel listings 116 may identify hotels that are associated with generic hotel listings 114 in the same list 112. In this case, the price identified in the generic hotel listing 114 may be lower than the price identified in the specific hotel listing 116 even though the listings are associated with the same hotel. Although generic and specific hotel listings 114 and 116 are not listed in a particular order in list 112, listings 114 and 116 may be ordered by name, location, price, hotel rating, type of listing (either generic listings 114 or specific listings 116 first), or in any other appropriate manner.

Hotel listing page 110 may also include an option to obtain more information about generic hotel listings 114. For example, hotel listing page 110 may include a information button 115 that a user may select to obtain a description that explains the "Major Brand Hotel" generic listings 114. This description may include certain obligations of a party making a reservation at a generically described hotel (such as a required reservation cancellation fee). Information button 115 may also be included on any other appropriate Web page. Hotel listing page 110 may also include options to make a reservation at a hotel, get information about a hotel, or get a map of a hotel's location. In exemplary hotel listing page 110, a user may select these options using a "Book It" button 118, a "Hotel Info" button 120, or a "Map" button 122, respectively. The result of a user selecting buttons 118 and 120 is described below. The result of a user selecting button 122 is the display of a map identifying the location of the associated hotel. If this option is selected for a generic hotel listing 114, this map displayed may only show a general area, such as downtown New York, and the exact location of the associated hotel will not be identified. Alternatively, map button 122 may not be provided for generic hotel listings 114.

FIG. 4 illustrates an exemplary generic hotel description page 130. Description page 130 is an example of a Web page that reservation engine 12 may communicate to a user in response to the section of a "Hotel Info" button 120 of hotel listing page 110. In particular, description page 130 includes a generic textual description 132 that may be associated with a generic hotel listing 114. As described above, generic descriptions 16 and specific descriptions 18 of hotels may be stored in hotel master database 12. A generic description 16 of a particular hotel may be the HTML or other Web document that is communicated as generic description page 130. Alternatively, generic description 16 may include information used to generate generic description page 130, including generic textual description 132. Generic description page 130 may be derived from a specific description 18 associated with the hotel represented by generic description page 130, and specific description 18 may be modified to remove information that might directly identify the particular hotel to the user. For example, if specific description 18 indicates that the hotel is located next the World Trade Center in New York, generic description 16 (and thus generic description page 130) may instead indicate that the hotel is located in the downtown area. Description page 130 may also include other relevant generic information, such as the hotel's star rating, general location, and property amenities. It should be understood that although generic description page 130 does not "directly identify" the hotel (for example, by giving the hotel name), it is possible that a user may be able to deduce the identity of the hotel based on other information known to the user. For example, if a user knows that there is only one hotel in a certain area, then the generic description of a hotel located in that area may identify the hotel to the user.

FIG. 5 illustrates an exemplary reservation inquiry page 140. Reservation inquiry page 140 is an example of a Web page that reservation engine 12 may communicate to a user in response to the selection of a "Book It" button 120 of hotel listing page 110. Reservation engine 12 may also communicate reservation inquiry page 140 to the user based on any other type of request by the user to make a reservation at a particular hotel. Inquiry page 140 is associated with a generic hotel listing 114 and thus does not include a specific hotel name. Inquiry page 140 may include one or more room type options 142 that a user might select at the hotel and one or more user information fields 144 in which the user may enter information that is used to make the reservation. This user information requested may include the user's name, address, telephone number, payment information, or any other appropriate information. When the user has selected or entered the necessary information, the user may select a continue button 146 to continue with the reservation process. When continue button 146 is selected, the user information is communicated from the user's computer 32 to reservation engine 12. Alternately, the user may communicate the information to an operator at call center 40, who then communicates the information to reservation engine 12.

FIG. 6 illustrates an exemplary reservation verification page 150 that may be communicated to the user's computer 32 in response to the user selecting continue button 146. Reservation engine 12 generates verification page 150 based on the user information received from the user. Verification page 150 provides a summary 152 of this information so that the user can determine whether the user information as entered and communicated correctly. The exemplary verification page 150 that is illustrated is associated with a generic hotel listing 114 since a generic hotel name is used to identify where the reservation is to be made. Reservation page 150 may also include information regarding the reservation process and contractual duties of the user once the reservation has been made (such as a cancellation fee that is required if the reservation is cancelled). Verification page 150 includes a book reservation button 154 that the user may select if the information listed on verification page is correct and the user desires to proceed with the reservation. Alternatively, the user may select an option to return to reservation inquiry page 140 or a similar page to re-enter incorrect user information.

When the user selects book reservation button 154 or otherwise indicates a desire to continue with the reservation, reservation engine 12 processes the user information to create a reservation. For example, reservation engine 12 may check the payment information, such as a credit card number, and charge the reservation to the credit card. Reservation engine 12 may also create a record of the reservation to be delivered to the hotel at which the reservation was made. This record may be delivered to the hotel at any appropriate time, including a batch delivery of all reservation records at the end of a business day.

Furthermore, reservation engine 12 may decrement the number of rooms available at the selected hotel in inventory database 20. Therefore, the room reserved by the user will not be available to subsequent users. If the room reserved by the user was the last room available on a certain date, the generic hotel listing 114 associated with the hotel may no longer be included in a hotel list 112 associated with a user search for available hotels on that date. Inventory database 20 may include an inventory of rooms that are actually available at a hotel and may be updated by hotels as needed. Alternatively, inventory database 20 may include a number of rooms that have been pre-reserved by an entity controlling reservation system 10 and that are effectively being "re-sold" to users of reservation system 10. In this case, hotels may have access to inventory database 20 or to another appropriate component associated with inventory database 20 so that the hotels can add rooms to the entity's inventory or change the price of the rooms in the inventory. For example, the entity controlling reservation system 10 may allow a hotel to reduce the price of the rooms that the entity has already pre-reserved. Any other appropriate method of making hotel rooms available to a third party intermediary that then provides the rooms to users is also included within the scope of the present invention.

FIG. 7 illustrates an exemplary reservation confirmation page 160. When the user has verified that the user information is correct and that the user desires to make the reservation, reservation engine 12 makes the reservation and communicates confirmation page 160 to the user's computer 32. At this point in the reservation process, reservation engine 12 discloses the specific identity of the hotel which previously has been described to the user in a generic manner (for example, using generic hotel description page 130). Therefore, confirmation page 160 may include contact and link information 162, such as links associated with the specific hotel at which the reservation has been made and the city in which the hotel is located. A link to a map of the exact location of the hotel may also be included. Conformation page 160 may also include reservation details 164. Again, details 164 include the specific name of the hotel and other information associated with the reservation, such as the check-in date and the number of nights for which the room is reserved.

FIG. 8 illustrates an exemplary specific hotel description page 170. Specific description page 170 may be communicated to the user's computer 32 in response to a request for hotel information by the user after the reservation has been made (for example, the user's selection of the "Hotel Info" option included in reservation confirmation page 160). Specific description page 170 is similar to generic description page 130, described above, since they are both descriptions of the same hotel. However, specific description page 170 includes more detail about the hotel since the identity of the hotel may now be disclosed to the user. For example, the illustrated specific description page 170 includes the name 172 of the hotel (instead of the previous "Major Brand Hotel" name), an address 174 of the hotel, and a picture 176 of the hotel. Specific description page 170 also includes a specific textual description 178 that includes details about the hotel that may not have been included in generic textual description 132 so as to conceal the identity of the hotel. Any other appropriate descriptive information may also be included in specific hotel description page 170.

Figure 9:
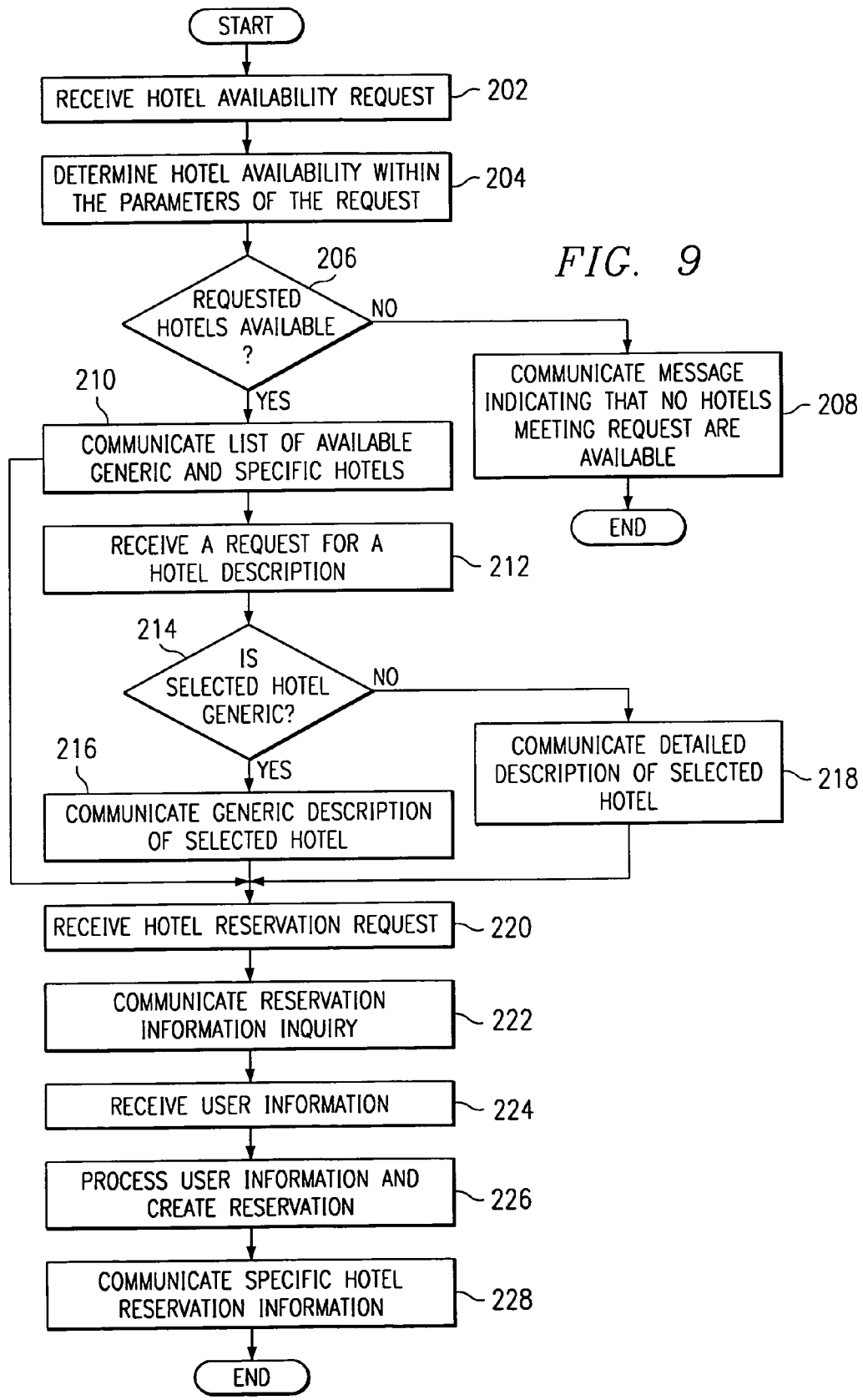
FIG. 9 illustrates an exemplary method for making a reservation using the reservation system.

FIG. 9 illustrates an exemplary method for making a reservation using reservation system 10. The method starts at step 202 when reservation engine 12 receives a hotel availability request from a user. As described above, the hotel request may be communicated over Internet 30 from a user at a computer 32, may be received at call center 40 from a user of a telephone 44, or may be received by reservation engine 12 in any other appropriate manner. Again, all references below to the communication of Web pages between the user and reservation engine 12 apply equally to communications between reservation engine 12 and an operator at call center 40 and communications between the operator and a user of a telephone 44. The hotel availability request may include one or more parameters that a hotel must meet, such as a location, dates of availability, rating, or any other suitable parameters. At step 204, reservation engine 12 determines one or more available hotels that meet the parameters of the request by accessing information stored in hotel master database 14 and/or inventory database 20. If reservation engine determines at step 206 that no hotels meet the parameters, then reservation engine 12 communicates a message to the user at step 208 indicating that no hotels meeting the request are available. The method may then end and reservation engine 12 may allow the user to try another search.

If reservation engine 12 determines at step 206 that one or more hotels meet the parameters of the request, then reservation engine 12 communicates a list of available generic and specific hotels, such as list 112, to the user at step 210. Reservation engine may then receive a request for a hotel description at step 212. Reservation engine 12 determines at step 214 whether the hotel listing for which the description was requested is a generic hotel listing 114 or a specific hotel listing 116. If the hotel listing is a generic hotel listing 114, reservation engine communicates a generic hotel description, such as generic description page 130, to the user at step 216. If the hotel listing is a specific hotel listing 116, reservation engine communicates a more detailed hotel description, such as specific description page 170, to the user at step 218. Reservation engine 12 may then receive a hotel reservation request from the user at step 220 indicating that the user desires to reserve a room at a selected hotel. Alternatively, reservation engine 12 may receive the reservation request after communicating the list of available hotels at step 210 or at any other appropriate time.

At step 222, reservation engine 12 communicates a reservation information inquiry, such as reservation inquiry page 140, to the user requesting information about the user to be used in making the reservation. The requested information may include the user's name, address, telephone number, and credit card number. Reservation engine 12 receives the user information at step 224 in response to the reservation information inquiry and processes the information at step 226 to create a reservation as specified by the user. As described above, reservation engine 12 may verify that the user information received is correct before processing the user information. Reservation engine 12 then communicates specific hotel reservation information, such as reservation confirmation page 160 and/or specific hotel description page 170, to the user at step 228. As described above, this information may be the first specific information that the user receives about the previously generically identified hotel at which the user has a reservation. Therefore, reservation system 10 provides a process of making a reservation at a hotel without disclosing the identity of the hotel to the user until after the reservation has been made. Among other advantages, this generic hotel reservation process allows a hotel to provide rooms at a discount price without undercutting the hotel's non-discounted price or less discounted price for the same rooms. Furthermore, the present invention also includes similar methods for providing other items using generic descriptions to initially conceal the identity of the item.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A transaction system, comprising:
   an item master database operable to store generic information and specific information associated with one or more items;
   an inventory database operable to store availability and price data associated with the items; and
   a transaction engine operable to:
   receive an item availability request, the request including one or more parameters;
   access the item master database and the inventory database to obtain information associated with the request;
   determine one or more items that meet the parameters of the request in response to obtaining the information from the item master database and the inventory database;
   communicate a list of the items meeting the parameters, the list including at least one generic item listing;
   receive a request for an item associated with a generic item listing; and
   complete a transaction associated with the item.

2. The transaction system of claim 1, wherein the transaction engine is further operable to:
   receive a request for a description of an item associated with a generic item listing; and communicate a generic description of the item, wherein the generic description does not directly identify the item.

3. The transaction system of claim 1, wherein the transaction engine is further operable to communicate a specific description of the item for which a transaction has been completed, the specific description identifying the item.

4. The transaction system of claim 1, wherein the generic information stored in the item master database comprises a generic name of an item and a generic description of an item.

5. The transaction system of claim 1, wherein the specific information stored in the item master database comprises a specific name of an item and a specific description of an item.

6. The transaction system of claim 1, wherein the price data stored in the inventory database comprises a discounted price associated with a generic item listing.

7. The transaction system of claim 1, wherein the generic item listing comprises a generic item name and a price of an item associated with the generic item listing.

8. The transaction system of claim 1, wherein: the transaction engine is coupled to the Internet; and the transaction engine is further operable to:
receive the item availability request from a computer coupled to the Internet; and
communicate the list of items to the computer in the form of one or more Web pages.

9. The transaction system of claim 1, wherein:
the transaction engine is coupled to a call center, the call center coupled to a telephone network and operable to receive calls from telephone users; and
the transaction engine is further operable to:
receive the item availability request from an operator at the call center, the operator receiving the item availability request from the telephone user over the telephone network; and
communicate the list of items to the operator for communication to the telephone user.

10. A computer implemented method for conducting transactions involving generically identified items, comprising:
receiving an item availability request, the request including one or more parameters;
obtaining information associated with the request from one or more databases, the databases including generic information and specific information associated with one or more items, availability data associated with the items, and a price of each item;
determining using the computer one or more items that meet the parameters of the request in response to obtaining the information from the databases;
communicating a list of the items meeting the parameters, the list including at least one generic item listing;
receiving a request for an item associated with a generic item listing; and
completing a transaction according to the request.

11. The method of claim 10, further comprising:
receiving a request for a description of an item associated with a generic item listing; and
communicating a generic description of the item, wherein the generic description does not directly identify the item.

12. The method of claim 10, further comprising communicating a specific description of the item after a transaction for the item has been completed, the specific description identifying the item.

13. The method of claim 10, wherein the generic information included in the one or more databases comprises a generic name of an item and a generic description of an item.

14. The method of claim 10, wherein the specific information included in the one or more databases comprises a specific name of an item and a specific description of an item.

15. The method of claim 10, wherein the price of one or more items included in the one or more databases comprises a discounted price associated with a generic item listing.

16. The method of claim 10, wherein the generic item listing comprises a generic item name and a price of an item associated with the generic item listing.

17. The method of claim 10, wherein:
receiving the item availability request comprises receiving the request from a computer coupled to the Internet; and
communicating the list of items comprises communicating the list to the computer in the form of one or more Web pages.

18. The method of claim 10, wherein:
receiving the item availability request comprises receiving the request from an operator at a call center, the call center coupled to a telephone network and the operator operable to receive the item availability request from a telephone user over the telephone network; and
communicating the list of items comprises communicating the list to the operator for communication to the telephone user.

19. A hotel reservation system, comprising:
a hotel master database operable to store generic information and specific information associated with one or more hotels;
an inventory database operable to store a number of rooms available at the hotels on one or more dates and a price of each room; and
a reservation engine operable to:
receive a hotel availability request, the request including one or more parameters;
access the hotel master database and the inventory database to obtain information associated with the request;
determine one or more hotels that meet the parameters of the request in response to obtaining the information from the hotel master database and the inventory database;
communicate a list of the hotels meeting the parameters, the list including at least one generic hotel listing;
receive a reservation request for a hotel associated with a generic hotel listing; and
create a reservation according to the reservation request.

20. The hotel reservation system of claim 19, wherein the reservation engine is further operable to:
receive a request for a description of a hotel associated with a generic hotel listing; and
communicate a generic description of the hotel, wherein the generic description does not directly identify the hotel.

21. The hotel reservation system of claim 19, wherein the reservation engine is further operable to communicate a specific description of the hotel at which a reservation has been created, the specific description identifying the hotel.

22. The hotel reservation system of claim 19, wherein the generic information stored in the hotel master database comprises a generic name of a hotel and a generic description of a hotel.

23. The hotel reservation system of claim 19, wherein the specific information stored in the hotel master database comprises a specific name of a hotel and a specific description of a hotel.

24. The hotel reservation system of claim 19, wherein the price of one or more rooms stored in the inventory database comprises a discounted price associated with a generic hotel listing.

25. The hotel reservation system of claim 19, wherein the parameters included in the hotel availability request comprise a date or dates for which a room is requested.

26. The hotel reservation system of claim 19, wherein the generic hotel listing comprises a generic hotel name and a price of a hotel room at a hotel associated with the generic hotel listing.

27. The hotel reservation system of claim 26, wherein the generic hotel listing further comprises an approximate location of the hotel associated with the generic hotel listing.

28. The hotel reservation system of claim 19, wherein: the reservation engine is coupled to the Internet; and the reservation engine is further operable to:
receive the hotel availability request from a computer coupled to the Internet; and
communicate the list of hotels to the computer in the form of one or more Web pages.

29. The hotel reservation system of claim 19, wherein:
the reservation engine is coupled to a call center, the call center coupled to a telephone network and operable to receive calls from telephone users; and
the reservation engine is further operable to:
receive the hotel availability request from an operator at the call center, the operator receiving the hotel availability request from the telephone user over the telephone network; and
communicate the list of hotels to the operator for communication to the telephone user.

30. A computer implemented method for making hotel reservations, comprising:
receiving a hotel availability request, the request including one or more parameters;
obtaining information associated with the request from one or more databases, the databases including generic information and specific information associated with one or more hotels, a number of rooms available at the hotels on one or more dates, and a price of each room;
determining using the computer one or more hotels that meet the parameters of the request in response to obtaining the information from the databases;
communicating a list of the hotels meeting the parameters, the list including at least one generic hotel listing;
receiving a reservation request for a hotel associated with a generic hotel listing; and
creating a reservation according to the reservation request.

31. The method of claim 30, further comprising:
receiving a request for a description of a hotel associated with a generic hotel listing; and
communicating a generic description of the hotel, wherein the generic description does not directly identify the hotel.

32. The method of claim 30, further comprising communicating a specific description of the hotel at which a reservation has been created, the specific description identifying the hotel.

33. The method of claim 30, wherein the generic information included in the one or more databases comprises a generic name of a hotel and a generic description of a hotel.

34. The method of claim 30, wherein the specific information included in the one or more databases comprises a specific name of a hotel and a specific description of a hotel.

35. The method of claim 30, wherein the price of one or more rooms included in the one or more databases comprises a discounted price associated with a generic hotel listing.

36. The method of claim 30, wherein the parameters included in the hotel availability request comprise a date or dates for which a room is requested.

37. The method of claim 30, wherein the generic hotel listing comprises a generic hotel name and a price of a hotel room at a hotel associated with the generic hotel listing.

38. The method of claim 37, wherein the generic hotel listing further comprises an approximate location of the hotel associated with the generic hotel listing.

39. The method of claim 30, wherein:
receiving the hotel availability request comprises receiving the request from a computer coupled to the Internet; and
communicating the list of hotels comprises communicating the list to the computer in the form of one or more Web pages.

40. The method of claim 30, wherein:
receiving the hotel availability request comprises receiving the request from an operator at a call center, the call center coupled to a telephone network and the operator operable to receive the hotel availability request from a telephone user over the telephone network; and
communicating the list of hotels comprises communicating the list to the operator for communication to the telephone user.

* * * * *